United States Patent [19]

Breault et al.

[11] Patent Number: 4,941,091
[45] Date of Patent: Jul. 10, 1990

[54] MAIL MANAGEMENT SYSTEM TRANSACTION DATA CUSTOMIZING AND SCREENING

[75] Inventors: Michelle S. Breault, Fairfield; John H. Steinmetz, Bridgeport, both of Conn.

[73] Assignee: Pitney Bowes Inc., Stamford, Conn.

[21] Appl. No.: 67,916

[22] Filed: Jun. 30, 1987

[51] Int. Cl.$^5$ .............................................. G06F 15/20
[52] U.S. Cl. .................................... 364/406; 364/466; 364/464.02
[58] Field of Search ............... 364/466, 406, 200, 900, 364/464.02

[56] References Cited

U.S. PATENT DOCUMENTS

| | | | |
|---|---|---|---|
| 4,301,507 | 11/1981 | Soderberg et al. | 264/900 |
| 4,410,961 | 10/1983 | Dlugos et al. | 364/900 |
| 4,574,352 | 3/1986 | Coppola et al. | 364/466 |
| 4,595,989 | 6/1986 | Daniels | 364/466 |

OTHER PUBLICATIONS

Leading Edge, "Nutshell", 1985, pp. 15, 220.

Primary Examiner—Jerry Smith
Assistant Examiner—Kim Thanh T Bui
Attorney, Agent, or Firm—Donald P. Walker; Melvin J. Scolnick; David E. Pitchenik

[57] ABSTRACT

A mail management system (MMS) is comprised of a host system communicatively coupled to one or more operator workstations. Each workstation may be further coupled to a postage dispensing device, such as a postage meter. A transaction record for each postage mailing transaction is collected, stored and transmitted to the host system from the workstation. The transaction record comprises a plurality of data fields. Some of the data fields are fixed data fields, that is they are transmitted for each transaction record. Other data fields are optional data fields which are transmitted from the workstation to the host system only if the host system has previously indicated to the workstation that the particular field is to be included within the transaction record.

22 Claims, 16 Drawing Sheets

FIG. 3.

TRANSACTION DATA FIELDS

| DATA | NUMBER OF BYTES | SOURCE OF DATA |
|---|---|---|
| ACCOUNT ID | 16 | INPUT BY OPERATOR AT WORKSTATION |
| JOB ID | 8 | INPUT BY OPERATOR AT WORKSTATION |
| JOB TYPE | 1 | INPUT BY OPERATOR AT WORKSTATION |
| OPERATOR ID | 4 | INPUT BY OPERATOR AT WORKSTATION |
| MACHINE ID | 2 | GENERATED BY WORKSTATION |
| DATE | 6 | GENERATED BY WORKSTATION FROM CLOCK |
| CLASS/SPECIAL FEE | 2 | INPUT BY OPERATOR AT WORKSTATION |
| TIME START | 4 | GENERATED BY WORKSTATION FROM CLOCK |
| TIME END | 4 | GENERATED BY WORKSTATION FROM CLOCK |
| TOTAL PIECES | 6 | GENERATED BY WORKSTATION |
| ACTUAL POSTAGE | 9 | GENERATED BY WORKSTATION |
| CHARGED POSTAGE | 9 | GENERATED BY WORKSTATION |
| METER DISCREPANCY FLAG | 1 | SET BY WORKSTATION |
| UNVERIFIED TRANSACTION | 1 | SET BY WORKSTATION |

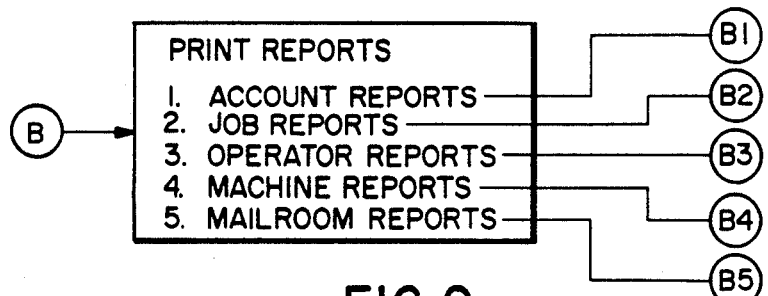
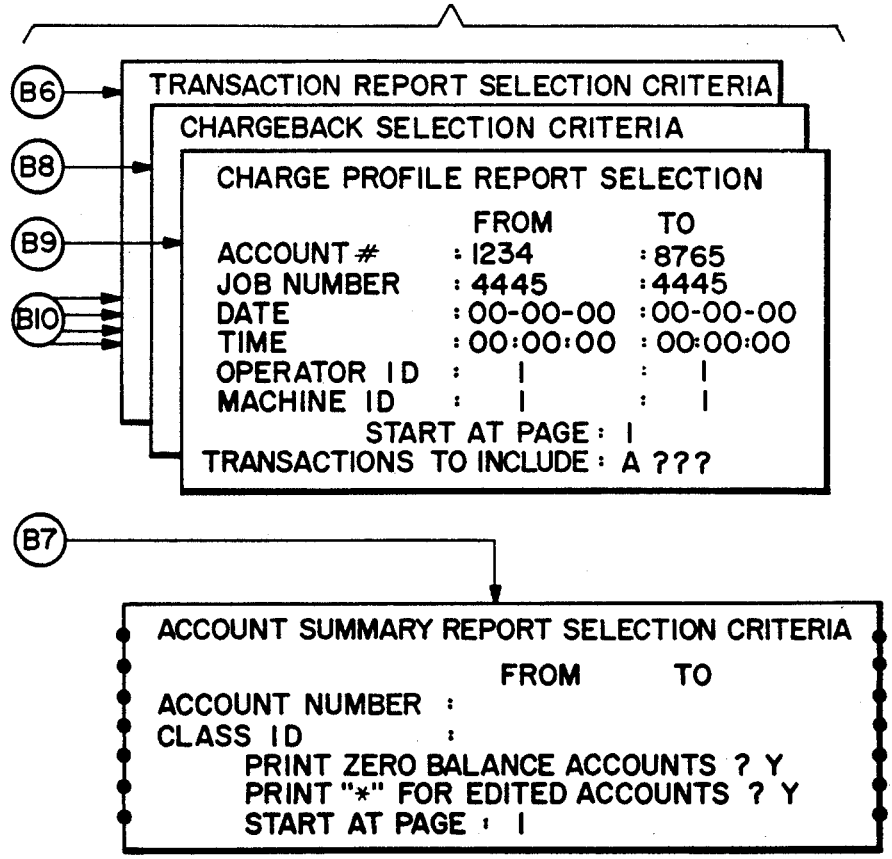

FIG. 13

...ACCOUNT SET UP REPORT...

| ITEM | ACCOUNT | ACCOUNT NAME | LOCKED | %SURCHG | EDITED | CHARGE BY | BUDGET ENTERED |
|------|---------|--------------|--------|---------|--------|-----------|----------------|
| 1. | 1234ABC | PERSONNEL | NO | 1.20 | | CLASS | YES |
| 2. | 5678DEF | PAYROLL | NO | 1.20 | | CLASS | YES |
| 3. | 222XXXX | RESEARCH | NO | 1.20 | | CLASS | YES |

ACCOUNT SUMMARY
3 ACCOUNTS ASSIGNED
  0 LOCKED
  3 UNLOCKED

3 ACCOUNTS WITH BUDGETS ENTERED

0 ACCOUNTS CHARGING BY ACCOUNT
3 ACCOUNTS CHARGING BY CLASS

...END OF ACCOUNT SET UP REPORT...

ADD ACCOUNT

ACCOUNT NUMBER : 1234567    ACCOUNT LOCKED? : N
ACCOUNT NAME   : PERSONEL   CLASS ENABLED? : N

YEARLY BUDGET   68,000.00

| BUDGET PERIOD | AMOUNT | BUDGET PERIOD | AMOUNT |
|---|---|---|---|
| JAN : | 0.00 | JUL : | 0.00 |
| FEB : | 0.00 | AUG : | 0.00 |
| MAR : | 0.00 | SEP : | 0.00 |
| APR : | 0.00 | OCT : | 0.00 |
| MAY : | 0.00 | NOV : | 0.00 |
| JUN : | 0.00 | DEC : | 0.00 |

(D6)

DISPLAY / MODIFY ACCOUNT

ACCOUNT NUMBER : 1234567    ACCOUNT LOCKED? : N
ACCOUNT NAME   : PERSONEL   CLASS ENABLED? : N

YEARLY BUDGET   68,000.00

| BUDGET PERIOD | AMOUNT | BUDGET PERIOD | AMOUNT |
|---|---|---|---|
| JAN : | 0.00 | JUL : | 0.00 |
| FEB : | 0.00 | AUG : | 0.00 |
| MAR : | 0.00 | SEP : | 0.00 |
| APR : | 0.00 | OCT : | 0.00 |
| MAY : | 0.00 | NOV : | 0.00 |
| JUN : | 0.00 | DEC : | 0.00 |

(D7)

DELETE ACCOUNT

ACCOUNT NUMBER : 1234567    ACCOUNT LOCKED? : N
ACCOUNT NAME   : PERSONEL   CLASS ENABLED? : N

YEARLY BUDGET   68,000.00

| BUDGET PERIOD | AMOUNT | BUDGET PERIOD | AMOUNT |
|---|---|---|---|
| JAN : | 0.00 | JUL : | 0.00 |
| FEB : | 0.00 | AUG : | 0.00 |
| MAR : | 0.00 | SEP : | 0.00 |
| APR : | 0.00 | OCT : | 0.00 |
| MAY : | 0.00 | NOV : | 0.00 |
| JUN : | 0.00 | DEC : | 0.00 |

(D8)

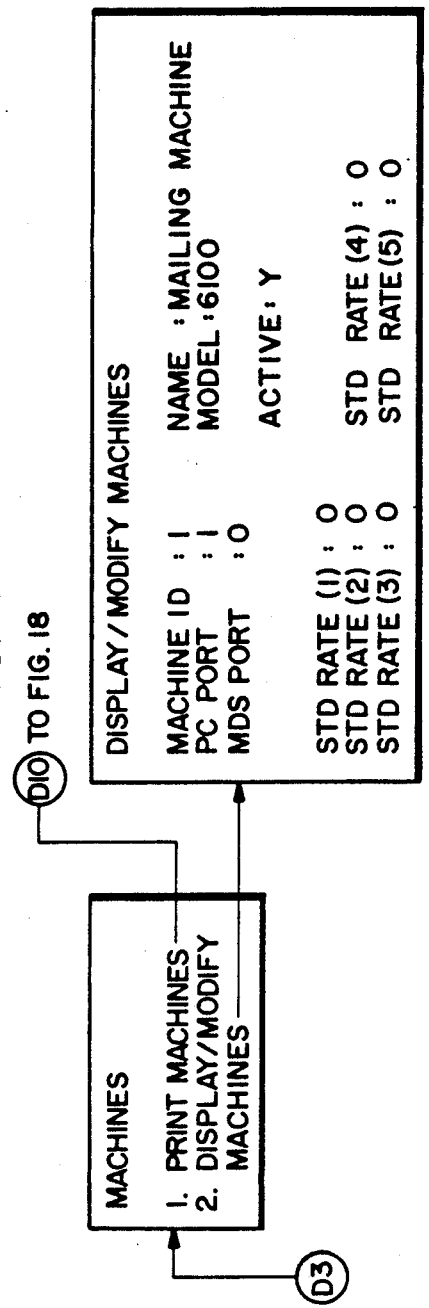

MONTHLY SET UP

| PERIOD | NAME | START | END | FROZEN |
|--------|------|----------|----------|----------|
| 1ST | : JAN | MM-DD-YY | MM-DD-YY | MM-DD-YY |
| 2ND | : FEB | MM-DD-YY | MM-DD-YY | MM-DD-YY |
| 3RD | : MAR | MM-DD-YY | MM-DD-YY | MM-DD-YY |
| 4TH | : APR | MM-DD-YY | MM-DD-YY | MM-DD-YY |
| 5TH | : MAY | MM-DD-YY | MM-DD-YY | MM-DD-YY |
| 6TH | : JUN | MM-DD-YY | MM-DD-YY | MM-DD-YY |
| 7TH | : JUL | MM-DD-YY | MM-DD-YY | MM-DD-YY |
| 8TH | : AUG | MM-DD-YY | MM-DD-YY | MM-DD-YY |
| 9TH | : SEP | MM-DD-YY | MM-DD-YY | MM-DD-YY |
| 10TH | : OCT | MM-DD-YY | MM-DD-YY | MM-DD-YY |
| 11TH | : NOV | MM-DD-YY | MM-DD-YY | MM-DD-YY |
| 12TH | : DEC | MM-DD-YY | MM-DD-YY | MM-DD-YY |
| 13TH | : | MM-DD-YY | MM-DD-YY | MM-DD-YY |

D12

DISPLAY/MODIFY SITE SET UP

ACCOUNT NUMBER LENGTH : 7      MULTIPLY ACTUAL
              TYPE : A          POSTAGE BY : 1.000

BUDGET ENABLED? : Y     JOB NUMBERS ENABLED? : Y

DEFAULT TO CLASS ENABLED                    : Y
MULTIPLE QUOTAS PER MACHINE ENABLED         : N
MDS PASSWORD - MANAGEMENT STATION DOWN      : 1234

D13

CLEAR DATA FILES

DESCRIPTION                          SELECT   VERIFY

CLEAR ACCOUNT LIST AND DATA    :
CLEAR OPERATOR LIST AND DATA   :
CLEAR MACHINE LIST AND DATA    :
CLEAR CLASS FEE AND LIST       :
CLEAR ACCOUNT/CLASS DATA       :
CLEAR OPERATOR/MACH DATA       :
CLEAR SET UP DEFAULTS          :
CLEAR TRANSACTION DATA         :

MAIL MANAGEMENT SYSTEM TRANSACTION DATA CUSTOMIZING AND SCREENING

FIELD OF THE INVENTION

This invention relates generally to mailing systems and, in particular, relates to a mail management system having a host system and one or more operator workstations communicatively coupled thereto, the invention providing for user defined mailing transaction data collection and reporting.

BACKGROUND OF THE INVENTION

One particular concern in all systems that dispense postage, such as a postage meter, is that an accurate accounting be made of all postage dispensed. This accounting is required by law and, typically, is accomplished by well known accounting registers within the postage dispensing system. These registers may have the form of ascending and descending registers. Typically, the ascending register is incremented by a value representative of the value of the postage dispensed while the descending register is simultaneously decremented by the total value of postage dispensed. At any given time in the operation of the system, the values of the ascending and descending registers must reflect the total amount of postage provided thereto. In order to provide an initial amount of postage funds to the system, the descending register is charged with a value amount which represents the amount of postage funds available to be dispensed, while the ascending register is set to a zero funds condition.

The evolution of mailing systems has resulted in the need for a mail management system which provides for the centralized control over one or more postage dispensing devices in such a way that the activity of the devices may be monitored and recorded by a host system. In this way, an accounting may be made of the activity of all of the postage dispensing devices which are coupled to the host. This centralized control leads to increased efficiencies and accounting reliability in the overall operation of a mailroom. As an example, in a large organization, such as a corporation, the mailroom typically performs mailing services for a variety of different clients, such as departments, within the organization. Individual clients may be the marketing department, the product department, the legal department and other diverse interorganization departments. In order that each department may be accurately charged for the services performed by the mailroom it is desirable to generate a report which allocates, for example, on a department by department basis, the postage expenditure and the value of services performed by the mailroom which are related to mailing functions.

In other organizations the mailroom may be a primary service provided by the organization, the organization typically processing and mailing material for a number of different clients. In this type of organization, it is essential that the postage dispensed and the services related to the dispensing of this postage be allocated on a client-by-client basis in order that each client may be correctly invoiced for the postage expended and the services rendered. Thus, it can be realized that in any type of organization having a mailroom that it is important that the mailroom be capable of uniquely identifying each client so that each client may be correctly invoiced. It can further be realized that it is important that certain costs associated with mailing be capable of being accurately identified in order that the postage or other charges associated with the mailpiece may be determined and accounted for. It can still further be realized that it would be beneficial to provide a user of a mail management system the ability to define a number of mailing transaction related parameters that the user wishes to record and to subsequently report, such as parameters related to operator and machine efficiencies and/or parameters related to total postage charges for a given account.

SUMMARY OF THE INVENTION

The foregoing features and other advantages are realized by a mail management system (MMS) which, in accordance with the method and apparatus of the invention, is capable of defining a plurality of fixed and optional mailing transaction related parameters and is further capable of providing the capability for a user of the system to define which optional transaction data fields are to be included within a block of transaction data fields which are processed by a host system or which are transmitted from a workstation to the host system.

In accordance with a system and method of the invention, an accounts management system is comprised of a host system communicatively coupled to one or more mail data stations, such as operator workstations. Each workstation may be further coupled to a postage dispensing device, such as a postage meter.

In accordance with the invention, a transaction record for each postage transaction is collected, stored and transmitted to the host system from the workstation. The transaction record comprises a plurality of data fields. Some of the data fields may be considered to be fixed data fields, that is they are transmitted for each transaction record. Other data fields may be considered to be optional data fields which are transmitted from the workstation to the host system only if the host system and workstation have been previously setup such that the particular field is included within the transaction record. The original determination of the fields that are to be included within the transaction is typically performed by an operator of the system.

Among the data fields that may be transmitted by the workstation as part of the transaction record are: an account number data field; a job number data field; a class of mail data field; a job type data field; an operator identification number data field; a workstation identification data field; a transaction start time, a transaction end time; a total piece count data field; an actual postage total data field; a charged postage total data field; and special fees data fields. Other data that may be transmitted from the workstation to the host are a meter discrepancy flag which indicates that a meter discrepancy preceded the instant transaction and an unverified transaction flag which indicates that the account number was not verified by the host system prior to the occurrence of the transaction.

Based upon certain data fields transmitted before the execution of a transaction the host is operable to perform such valuable functions as verifying the validity of the account number and also the operator ID.

This transaction record data may be sent to and stored by the host system for subsequent reporting at the completion of each mailing transaction. At the request of the host system operator, certain of these data fields are "posted" or summarized to several data bases such as to an account/class or to a machine/operator for subsequent report summaries. At a subsequent time, the information conveyed by these data fields may be organized and printed out in a report format which provides for an accurate and comprehensive record of postage and other mail related costs and parameters which are associated with a given account number.

BRIEF DESCRIPTION OF THE DRAWINGS

These and other aspects of the invention will become more apparent from the following detailed description of the invention taken in conjunction with the drawings, wherein:

FIG. 3 shows an illustrative format of data fields expressive of different mail transaction parameters; and FIGS. 4–21 show various display screen menus which may be displayed to an operator during the operation of the MMS.

DETAILED DESCRIPTION OF THE INVENTION

Figure 1:
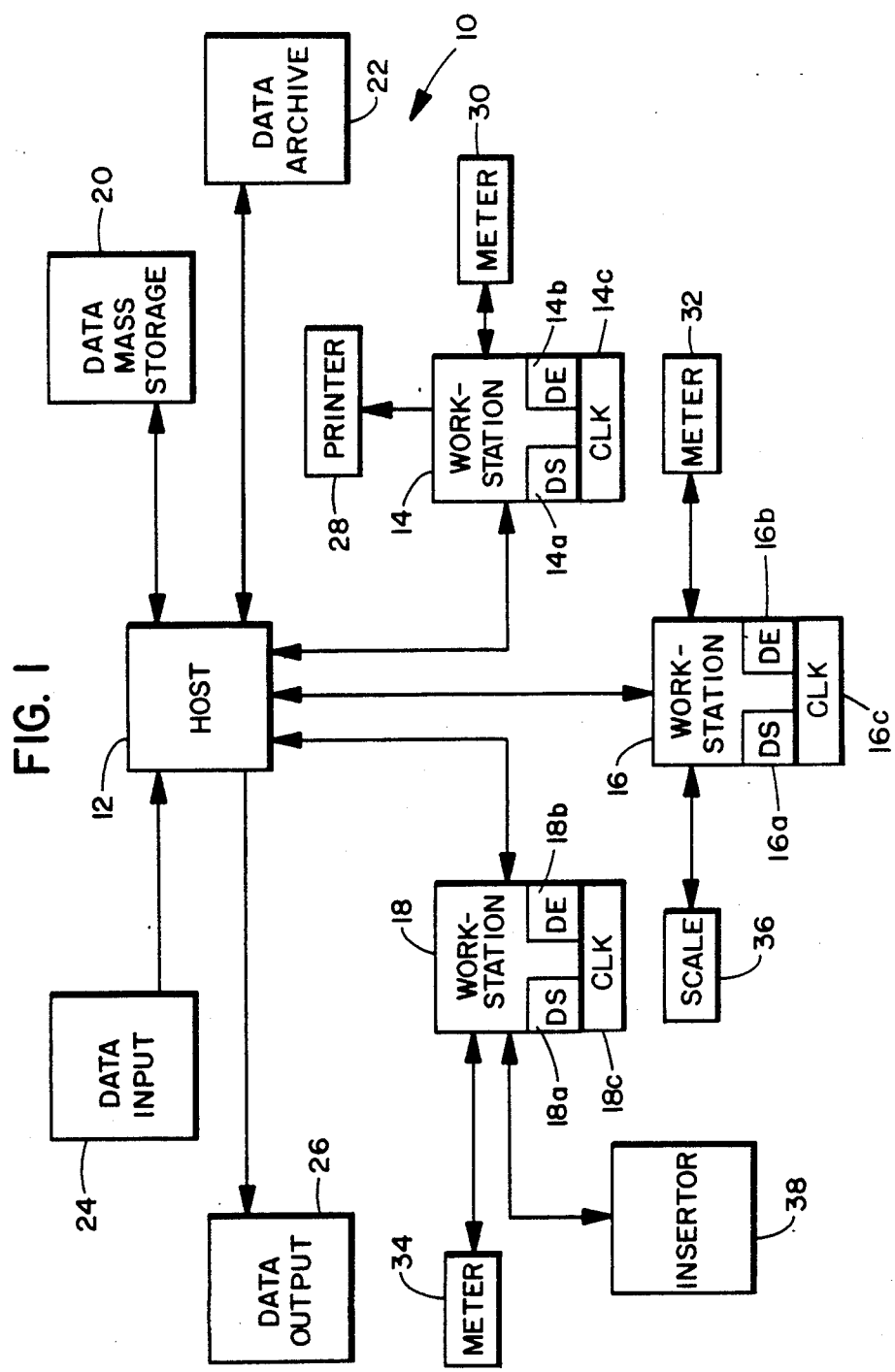
FIG. 1 is a block diagram showing a mail management system in accordance with the invention.

Referring first to FIG. 1 there is shown in block diagram form a mailroom management system (MMS) 10 embodying the principles of the invention. MMS 10 can be seen to be comprised of a host 12 which is bidirectionally coupled to a plurality of mail data stations, (MDS), such as operator workstations 14, 16 and 18. Although three such workstations are shown in FIG. 1 it should be realized that more or less than three may be coupled to the host 12. For example, from one to some large number, such as 16, workstations may be so coupled to the host 12. The manner of coupling between host 12 and a particular workstation, such as the workstation 14, may be by any of a variety of well known data communication coupling means. Such means may include bit serial data communication means such as RS-422 or RS-232. The connection may also be by a parallel data coupling means. The connection may also be made via telephonic modem or by any of a number of similar long distance data communication means. Thus, it can be seen that an individual workstation may be physically located proximate to the host 12 or may be physically located at a great distance from the host 12.

Host 12 may be a microcomputer, a minicomputer, a personal computer or even a main frame type computer. In general, the host 12 has the characteristics of a data processing system which is operable for communicating with individual ones of the workstations 14 through 18 and also for executing a variety of software programs such as programs suitable for the transmission and reception of data to and from the workstations, accounting programs suitable for accounting for postage transactions, and report generation programs operable for producing reports indicative of postage and other expenditures on an account by an account basis. Other reports generated by host 12 may be reports expressive of overall machine, operator and mailroom productivity, such as reports indicative of equipment usage, equipment downtime and operator efficiency. As can be appreciated, such programs may be software elements of a data base management system (DBMS), the data base being comprised of individual accounts and accounting data related to these accounts. Data, which typically comprises mail and postage accounting data, may be stored within an internal memory of the host 12 and/or may be stored on a data mass storage means 20 such as a well known magnetic disk. The aforementioned software programs may also be stored on mass storage means 20. Host 12 may also have a data archiving and backup means 22, such as a tape storage device, for storing this postage accounting data. Also coupled to host 12 is typically an operator data entry means, such as a keyboard 24 whereby an operator may enter data and desired commands into the host 12. The host 12 may also have data output means which may comprise a well known display device 26 for displaying various function menus and entered data to the operator. The data output means may also comprise a printer which is operable for printing reports of mail transaction related data under the control of the host 12.

Each of the operator workstations 14 through 18 may also comprise a microcomputer (not shown) or a similar type of data processing system. Each of the workstations may also typically comprise an integral data entry (DE) device 14a through 18a, respectively, such as an alphanumeric keypad or a typewriter type keyboard. Each of the workstations may also comprise a local data storage (DS) means 14b through 18b, respectively, for the local storage of data, including mail related data, such as mail transaction data. Each of the workstations may also comprise an integral printer (not shown) for printing postage related data for viewing by an operator or, each may be coupled by a communication port to an external printer 28 for printing such data. Each of the workstations may also comprise a calendar/clock (CLK) device 14c through 18c, respectively, which is operable for maintaining the time of day and the date. Each CLK 14c through 18c is coupled to the workstation data processing system such that the time and date may be determined therefrom. Such calendar/clock devices are well known in the art and will not be further described herein. Of course, the current time and date may also be maintained by software routines which may count events which occur at predetermined intervals of time, such as interrupts generated by zero line crossings of the input power. Each of the workstations may also be communicatively coupled to a postage meter 30, 32 and 34, although in some systems there may be a plurality of workstations only some of which, or even only one of which is coupled to a postage meter. Each meter comprises a postage indicia generation means, such as a printer, and postage accounting registers. As has been previously described, these registers are typically an ascending and descending register which are incremented and decremented, respectively, by an amount equal to the amount of postage dispensed by the meter. The accounting registers may be contained within a non-volatile memory means within the meter, as is well known in the art. Each of the meters 30, 32 and 34 is operable to dispense postage when so commanded by the attached workstation 14, 16 and 18, respectively. In addition, each of the meters is operable for transmitting to the attached workstation at least the current values of the ascending and descending registers, and also the total number of pieces of mail having postage applied thereto.

In addition, each workstation may have a mail piece weighing means such as a scale 36 attached thereto. Each of the workstations may also be coupled to an insertion machine, such as a highspeed insertion machine 38 which is operable for collating a plurality of mailpiece inserts, inserting this collation into an envelope and subsequently conveying the envelope to the meter 34 to have the correct value of postage applied thereto. Each of the workstations may also be coupled to a mailing machine (not shown).

One particular workstation which is particularly well suited for the above described functions is known as the A305 workstation which is manufactured by Pitney Bowes Incorporated of Stamford, Conn.

Figure 2:
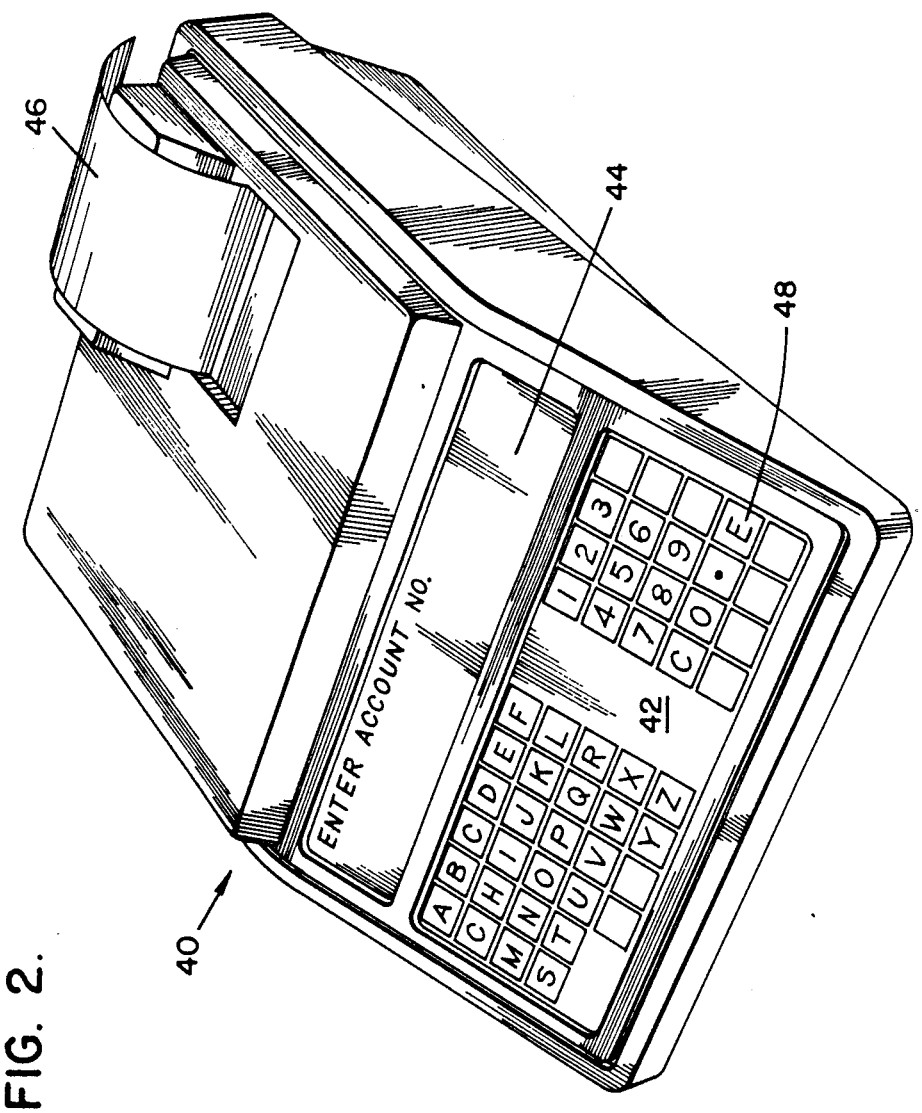
FIG. 2 shows a representative operator workstation useful with the system shown in FIG. 1.

Referring to FIG. 2 there is shown a representative view of a typical workstation 40 which is suitable for practicing the invention. It can be seen that the workstation 40 has an alphanumeric keyboard 42 for the entry of data and a display 44 for displaying the entered data and other information, such as prompts for information, to an operator. The workstation 40 also has a plurality of integral communications ports, not shown in FIG. 2, such as RS-422 ports, at least one of which is operable for bidirectional communication with the host 12. Other communication ports, such as ECHOPLEX ports, may be utilized for coupling the workstation to a scale, printer, meter and/or an inserter system. Workstation 40 may also have a printer 46 for printing data for viewing by the operator. The workstation 40 typically comprises an integral data processing means, such as a microprocessor device (not shown), and the requisite program and data memory (not shown) for executing software routines which are operable for providing a number of different functions related to the overall control of workstation 40. These functions may include the inputting of data from keyboard 42, the display and printing of data and the communication of data with host 12 and other devices coupled to the communications ports (not shown). The workstation also typically comprises a calendar/clock device (not shown) which is readably coupled to the internal microprocessor device, the calendar/clock device maintaining the current date and time of day.

In general, the MMS system 10 operates as a distributed data entry system wherein data is entered at one or more workstations by an operator or operators. This data generally relates to the processing of mail within the mailroom. This entered data, or mail transaction data, is collected and is stored by a workstation and, typically, at the end of a mailing transaction is transmitted to the host 12 where the transaction data is stored. At desired, predetermined intervals this stored data may be formatted into a form which is suitable for the printing of reports. One type of report is a "posting" report which is a summary report of individual mailing transactions. These printed reports may contain data related to postage expenditures and other mail processing costs, the data being organized in an account-by-account type of format. Other reports may relate to operator or machine productivity and may be organized in an operator or a machine format, such as Operator Performance Reports and Machine Performance Reports. These other types of reports will be described hereinafter.

Figure 4:
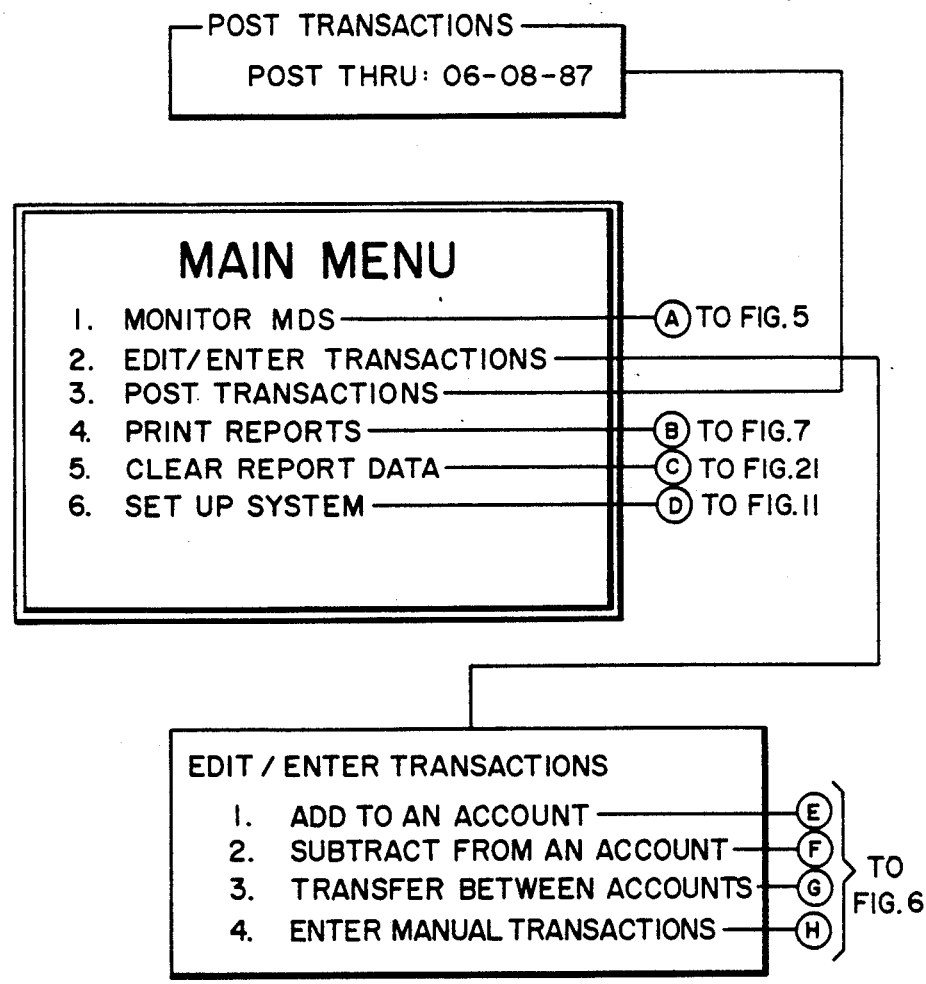
Figure 5:
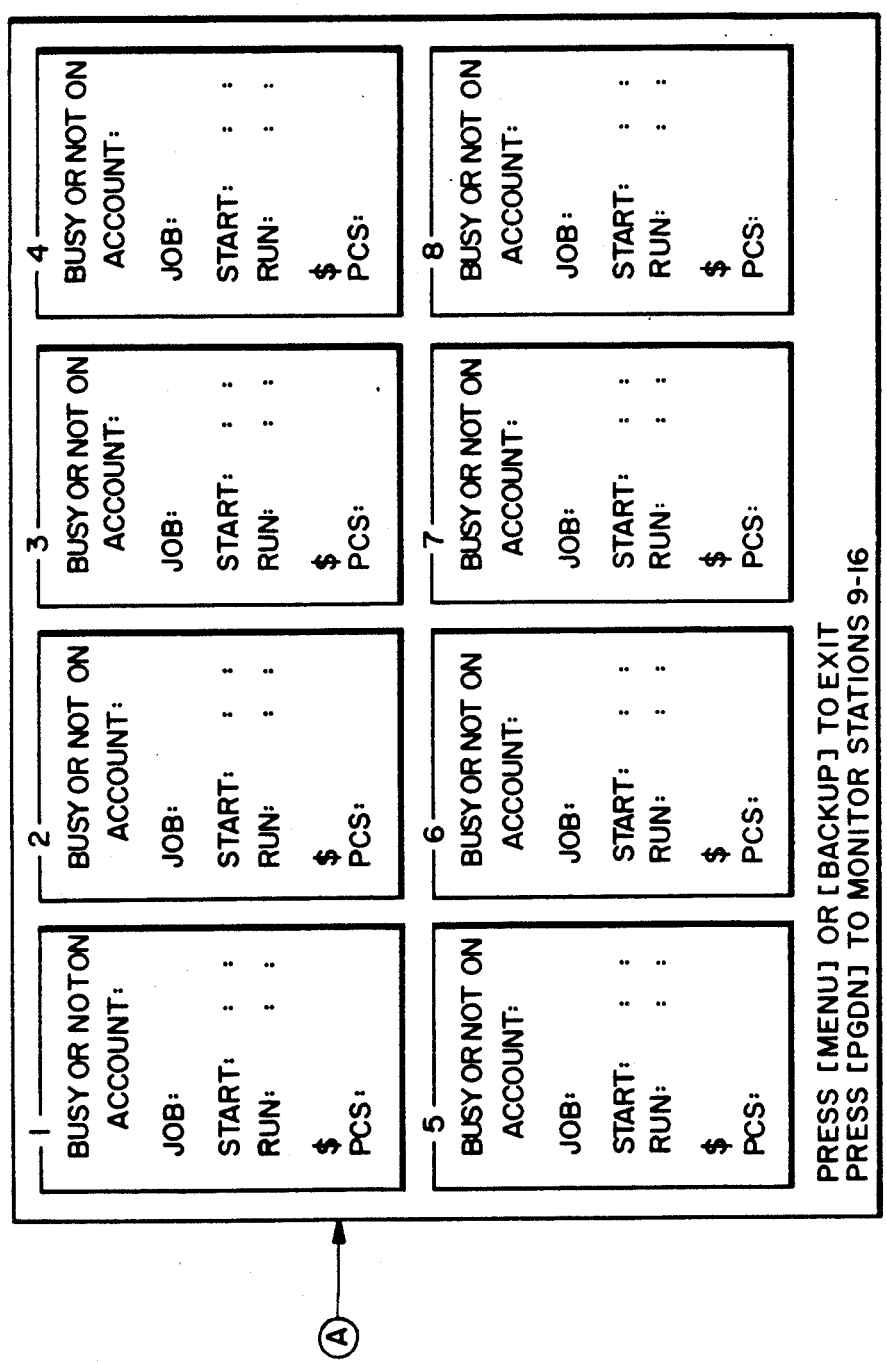
Figure 6:
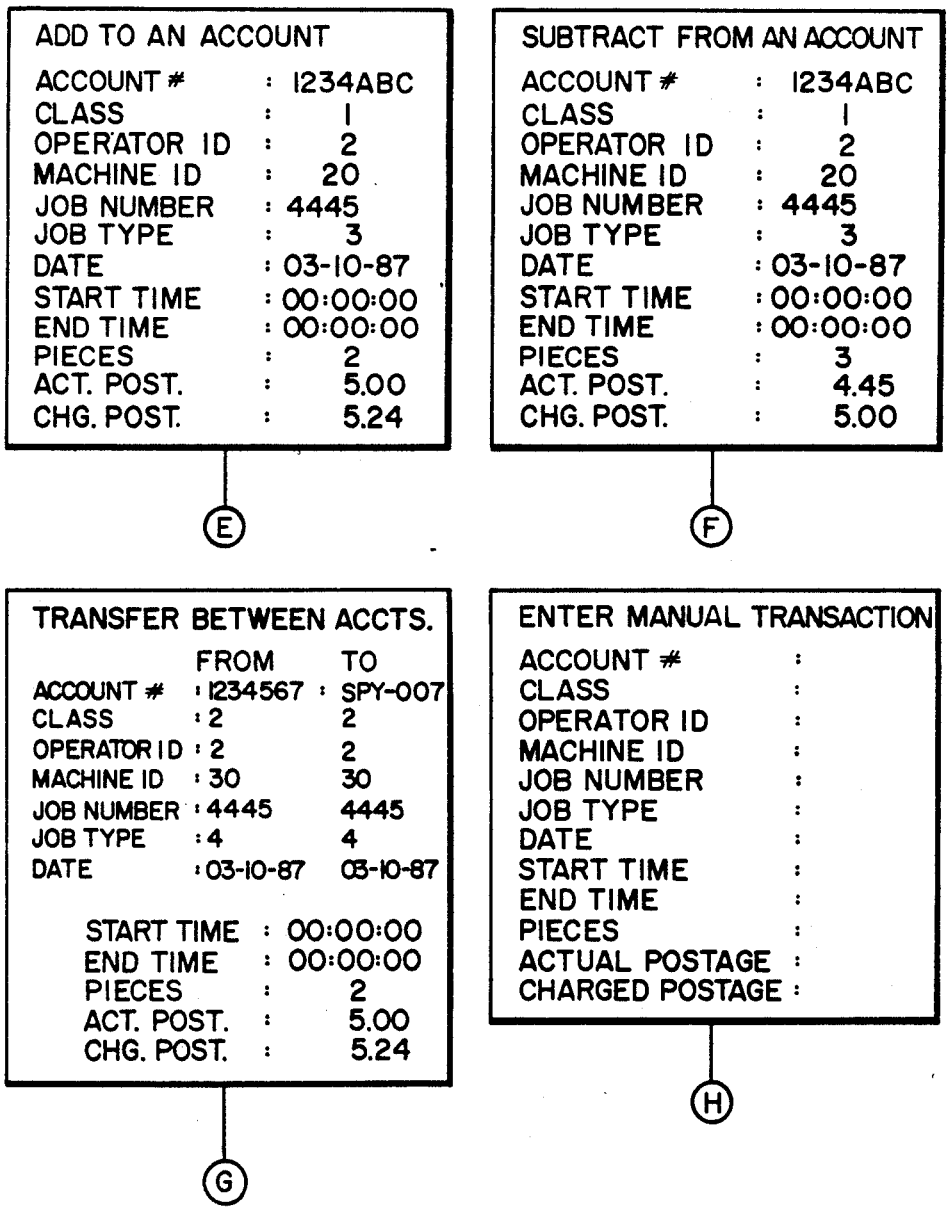

Referring now to FIGS. 4-21 there are shown a plurality of illustrative display screen menus which may be displayed to an operator of the system 10 during the operation of the system. Referring first to FIG. 4 there can be seen a Main Menu from which the operator may select one of a plurality of submenus. For example, if the Main Menu is displayed as shown in FIG. 4, the entry of the numeral 3 into keyboard 24 will result in the Post Transactions submenu being displayed to the operator. As can be seen, the Post Transactions submenu may prompt the operator to enter a date, the date relating to an interval of time for which the posting data is desired.

Figure 8:
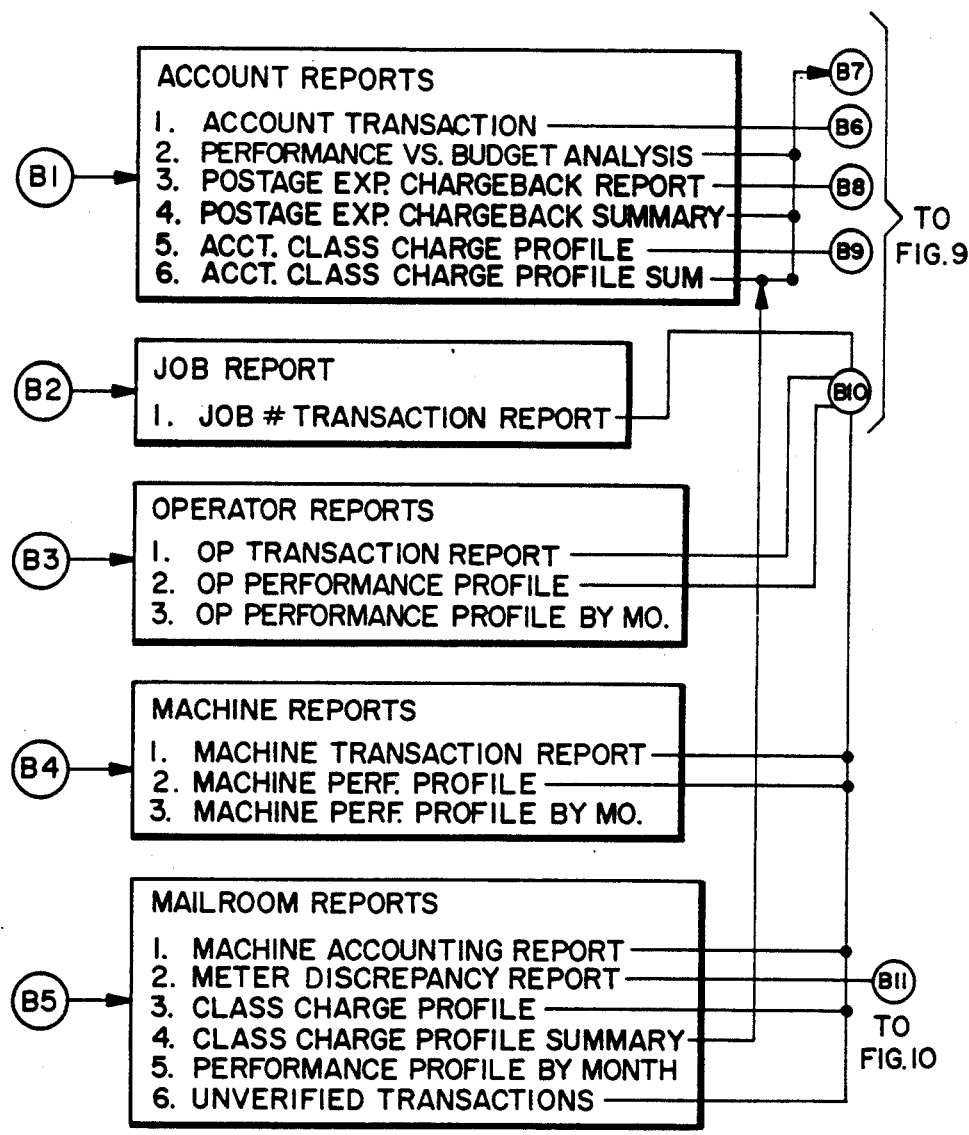
Figure 11:
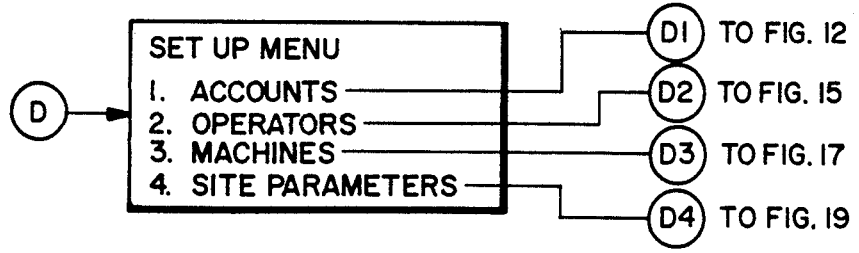
Figure 10:
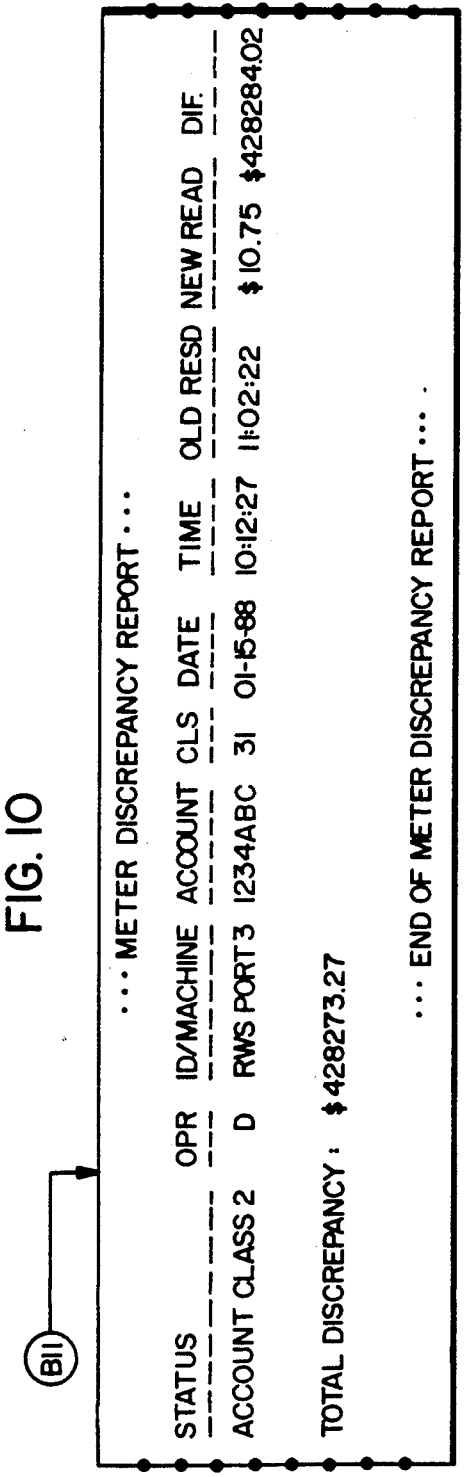
Figure 12:
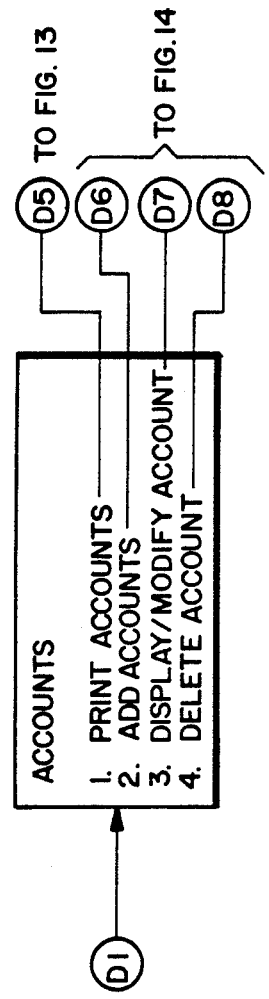
Figure 15:
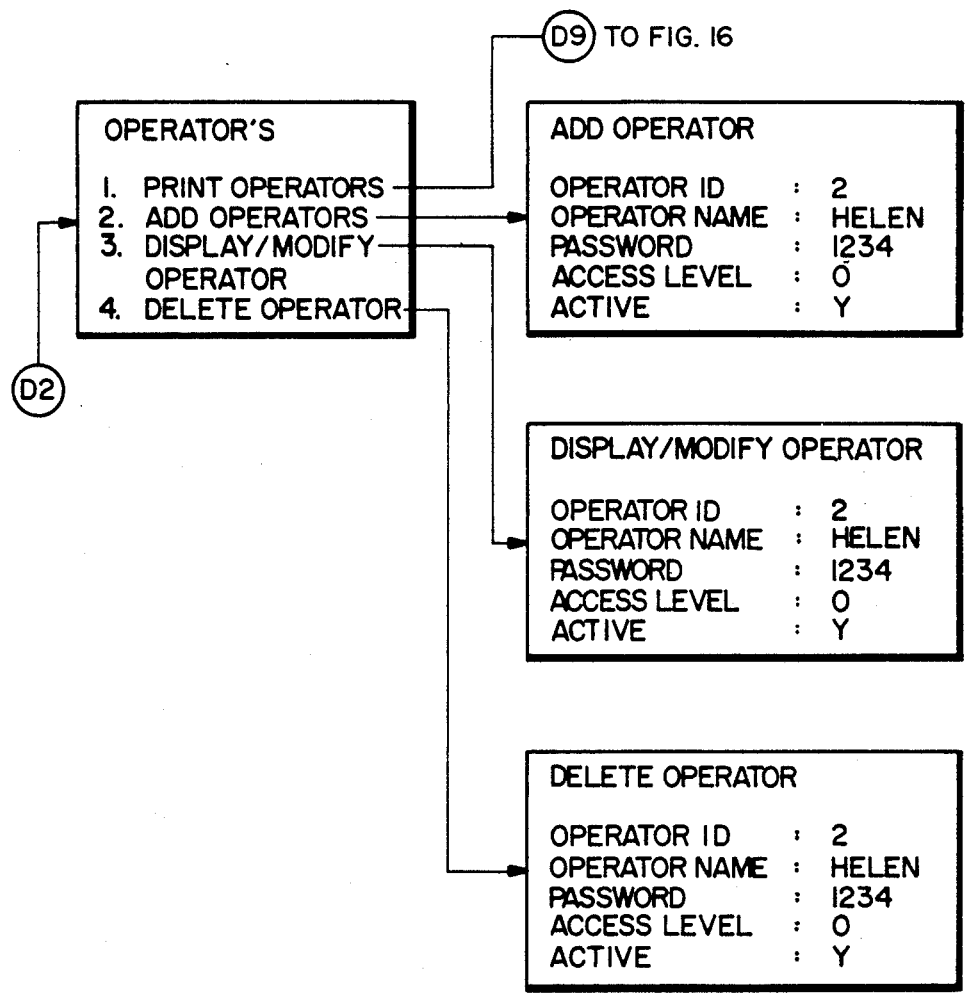
Figure 16:
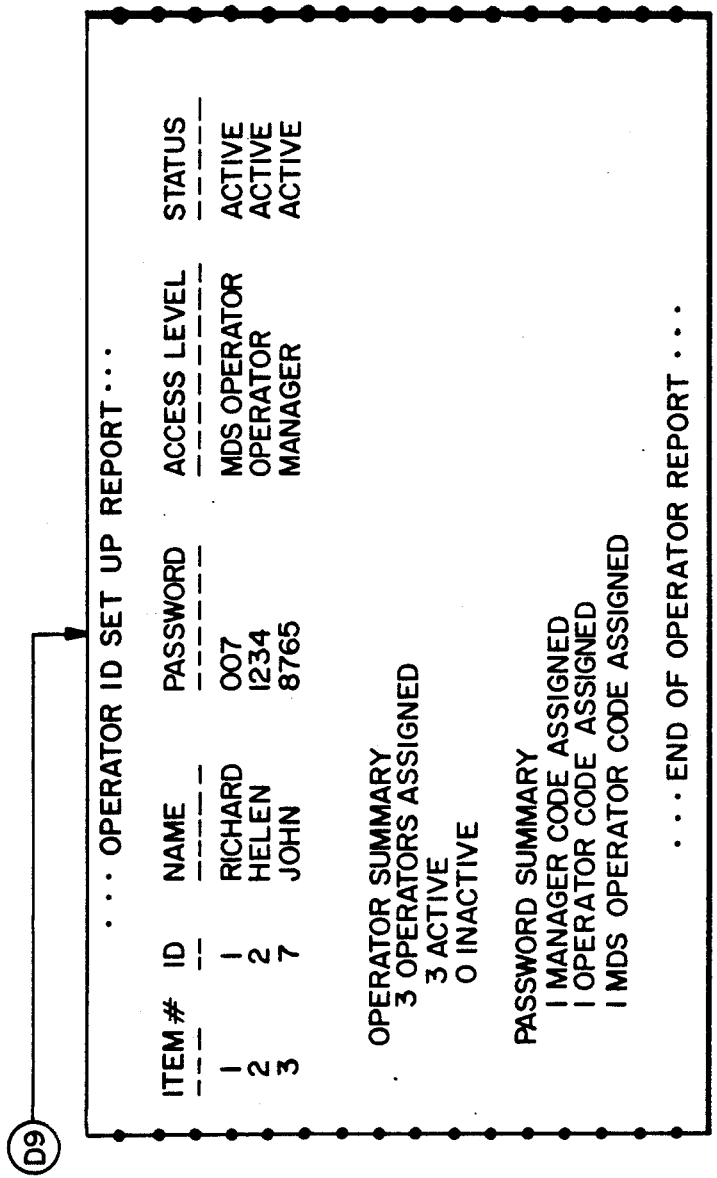
Figure 19:
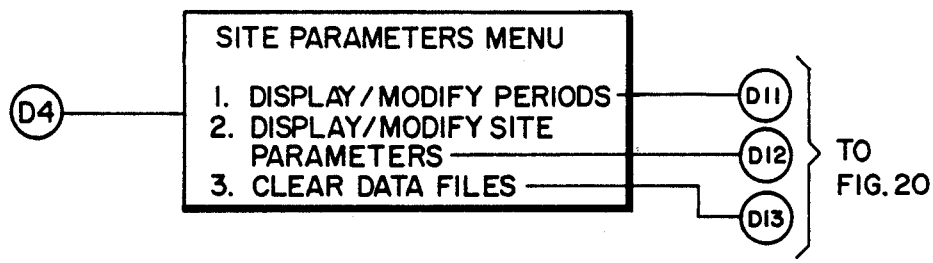
Figure 21:
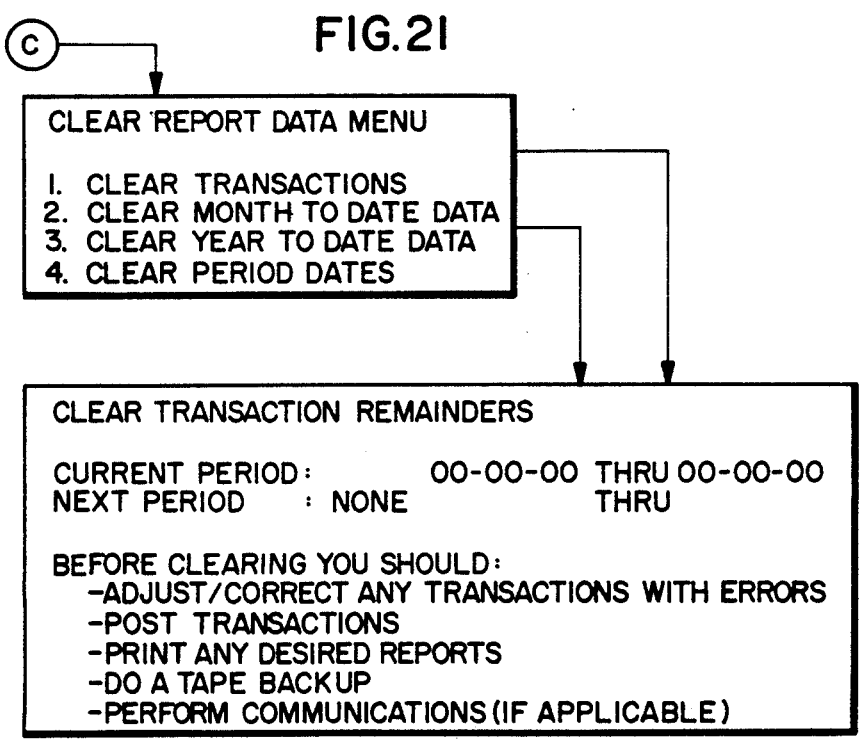

If the operator were to enter the numeral 4 when the Main Menu is displayed the Print Reports submenu would be selected and displayed to the operator, as shown in FIG. 7. As can be seen in FIG. 7, the Print Reports submenu comprises a number of different types of reports which may be printed by the system 10, such as Account Reports, Operator Reports and Mailroom Reports. If, for example, the operator were to enter the numeral 1 when the Print Report's submenu is displayed, the Account Reports menu would be selected as shown in FIG. 8. In response to the displaying of the Account Report's submenu the operator may further select which type of Account Report is to be printed. The selection of a particular Account Report by the operator results in further submenus being displayed to the operator as shown in FIG. 9.

Thus, it can be realized that these various menus which are displayed by the host 12 to an operator facilitate the operation of the system 10 by the operator. It should be realized that the menus shown in FIGS. 4-21 are illustrative only and that more or less than the menus shown may be employed in a given system, the particular menus being employed possibly displaying other data or data having a different format than the particular menus shown in FIGS. 4-21.

In order to differentiate between the possibly large number of accounts which are maintained by the host 12, each account is typically assigned a unique account identification code, or account code. In order to express the account code, the host 12 may have a predetermined maximum number of data bytes allocated for expressing the account code. For example, an account code may be defined to be a data field of up to 16 bytes in length. Of course, not all of the 16 bytes need be used in a given system.

One feature of the present invention is the detailed and accurate accounting of postage and other mailing related expenses for each such uniquely identified account. Not only does this accounting accurately provide for the allocation of postage costs incurred by an account during an interval of time but it also provides other valuable information such as the number of pieces of mail processed for the account and the differentiation of mailing costs into various job numbers.

This is accomplished by, for each postage transaction, the transmission of transaction data from a workstation to the host system. In general, the workstation 40, for each such transaction, will collect, store and transmit to the host system 12 the transaction data. The transaction data is comprised of data fields some of which are constant, or fixed, data fields and others of which are optional data fields. The optional data fields may be specified by an operator of the system at the host system or at a workstation on a workstation-by-workstation or account-by-account basis. The system operator may specify the optional data fields during a Transaction Data Customizing Procedure during MMS setup, which is typically accomplished by a software program which is run on the host system. The host system will thereafter process only those optional data fields so specified.

The host system has data storage means, such as the aforedescribed mass storage 20, for storing the transaction data fields received for each transaction on, for example, an account-by-account basis.

It should be noted that a mailing transaction may represent one or more pieces of mail with similar characteristics that are processed. Those characteristics may be the same operator, same workstation, same class of mail, same special fees and/or the same postage. The transaction may represent a single piece of mail or a batch of mail. The end of a mailing transaction may be identified by the operator depressing an End Transaction key 48 on the workstation keyboard 42.

There are in general three types of mailing transactions. A metered transaction may represent a postage value established at the workstation from the total pieces and total postage as determined from the attached postage meter. These metered transactions typically use the classes and special fees defined for USPS and UPS mail.

A non-metered carrier transaction may represent a transaction wherein the total pieces and total postage are not obtained from the meter. In this case, the selection of specific classes of mail will cause the workstation to prompt the workstation operator to enter the total pieces and total postage. This type of transaction is typically used for express carrier transaction logging, chargeback of a postage due payment made by the mailroom for the account and chargeback for stamp purchases made for an account.

A non-metered manual transaction is another type of charge that can be chargedback to an account. This transaction is not based on the metered or carrier types of mail. Rather, the mailroom is charging back for manual activities such as hand folding, hand inserting, direct delivery, etc.

Referring to FIG. 3 there is shown representative transaction data fields which may be received by the host from a workstation for a typical mailing transaction. FIG. 3 illustrates the nature of data field, the number of data bytes which may comprise each individual field and also the source of the data within each particular field. It should be realized that the data fields of FIG. 3 are illustrative only and that more or less data fields may be utilized by the host system in conjunction with the workstation. Also, the number of bytes which comprise each data field are illustrative, it being realized that more or less than the number of bytes shown may be so utilized. It should be further realized that the number of bytes shown may actually be stored by the host system in a packed or compressed format, as is well known in the art, and that the ordering of the fields may be different than is shown in FIG. 3.

As can be seen, the table of data may comprise an Account Identification (ID) data field having 16 bytes. The Account ID is typically the first data entered by the operator of the workstation to initiate a transaction. The Account ID is utilized to uniquely identify the account with which the following data fields are to be associated. The next data field may be a Job ID. The Job ID data field is also entered by the operator of the workstation in order to identify the particular transaction associated with the account ID. In general, the Job ID is an optional data field which may be required by a system manager, who may also be the host system operator, specifying that the Job ID field should be included within the transaction record. If so specified by the host system operator, the host system may, as part of a Workstation Initialization Procedure, transmit to the workstation data indicating that the workstation is to prompt the operator to enter the Job ID. The workstation will thereafter prompt the operator, typically by displaying in the display 44 shown in FIG. 2, that the Job ID number is required. The aforementioned Workstation Initialization Procedure is another software program executed at the host system which is operable to transmit to a workstation certain information which may be utilized by the workstation to perform mailing related tasks.

The next data field may be a one byte Job Type data field which is expressed typically as a number having a value of from, for example, one to five. The Job Type data field thus allows five different job types to be specified each with a different associated mailpiece/hour production rate. For example, one job type may represent a one piece mail insert and another job type may represent a three piece mail insert. Each of these two job types would have a different predetermined production rate associated therewith. As can be appreciated, the Job Type data field, in conjunction with the Transaction Start and Transaction End Time data fields, which are described below, may facilitate the generation of operator and machine efficiency reports.

The next data field can be seen to be an Operator ID data field. Typically, each workstation operator will be assigned a unique identification code. This code is recorded as a part of the basic transaction data field and is used to identify the specific operator who performed the transaction. The use of an Operator ID data field enables the host system to generate, at the host system operator's request, Operator Performance Reports. That is, the host system may generate a report which indicates the usage of the workstation or workstations by a specific operator as an aid in evaluating the performance and efficiency of the workstation operator. The Operator ID code may not need to be entered for every transaction at a workstation, but rather only when a new operator begins the operation of the workstation.

The next data field may be a Machine ID data field. In general, a Machine ID code for each workstation is assigned at the host system and transmitted to a workstation as part of the aforementioned Workstation Initialization Procedure. This machine ID code is thereafter transmitted by the workstation as a part of every transaction record and is used by the host system to identify the source of the transaction data and also to monitor the activity of a particular workstation. This enables the host system to generate upon request a Machine Performance Report which may be utilized by the mailroom supervisor to determine the usage of each of a plurality of workstations or the usage of other machines coupled to the workstations, such as a mailing machine. The Machine ID code is not entered by the operator of the workstation and, in fact, the operator may be unaware of the particular Machine ID assigned to the workstation with which he is operating. It should be realized that if a particular workstation is coupled to, for example, a mailing machine, that the mailing machine may also be assigned a Machine ID code.

Three data fields seen in the table of FIG. 3 relate to the Date, Time of Transaction Start and the Time of Transaction End. As was previously stated, each workstation may comprise a calendar/clock device or time keeping software routines which are operable for maintaining the data and current time. Thus, each workstation is operable to so transmit this data to the host system as part of the transaction record. The Date is typically the date of the mailing transaction, the Start Time is a time which identifies the time that the processing of mail for the current transaction began. The actual Start Time may be defined to be the time when an account number has been entered and/or verified by the host system. The Time End identifies the time at which the processing of mail ended. The End Time may be defined to be the time when the End Transaction key 48 is depressed on the workstation keyboard by the operator. The aforementioned three data fields related to the date and time are generated automatically by the workstation without intervention by the operator.

The next data field relates to Class/Special Fee data fields which in general relate to classes of mail which are predefined by the host system such as, for example, first class mail, second class mail, air mail and so on. Also, other classes of mail may be so defined which do not relate directly to postage costs. These other classes may be, for example, charges incurred by the use of a courier service, charges related to the purchase of stamps and other mailing supplies, and also a predefined labor rate for some operator activity such as manually inserting collations into an envelope for mailing. As can be realized, the mail class data field may be indicative of the aforementioned three types of mailing transactions, that is, metered transactions, non-metered carrier transactions and non-metered manual transactions.

The special fee portion of the data field are optional data fields relating to fees which are additive to the basic transaction. During subsequent reporting of the transactions the special fees will typically appear as separate line items so that they may be differentiated from the basic postage costs. If utilized, special fee values may be inputted at the workstation by the workstation operator or may originate from another source, such as from a scale coupled to the workstation.

The next data field is a Total Pieces data field which relates to the total piece count for a transaction. The total piece count for a given transaction may be obtained by the workstation from the attached postage meter or may be entered by the operator depending on the mail class type of the transaction.

The next data field is an Actual Postage data field, the Actual Postage total for a given transaction being typically determined at the workstation based upon the difference between the postage meter ascending register value at the beginning of the transaction and the value of the ascending register at the end of the transaction. As has been previously described the ascending register is typically located within the postage meter, the postage meter being operable for transmitting this value upon request to the workstation.

A Charged Postage Total data field is an optional data field determined by special charging criteria established by the mailroom supervisor. For example, a company or a university which has a mailroom may charge a given department, identified by a unique Account ID, a higher postage rate than the actual metered rate. For instance, the postage for a given transaction may be metered at a presorted discount rate of 18 cents per mailpiece. However, the department may be charged at a nondiscounted rate of 22 cents. This differential allows the mailroom to charge an overhead factor related to its operation and also to operate within the organization as a profit center. In order to accommodate this feature the workstation operator is prompted to enter a "surcharge rate". This is an operator optional entry. Alternatively, overhead expenses could be dictated at a flat rate at the host and charged back to various accounts at the flat rate.

Other transaction related data may be sent by the workstation to the host. For example, a meter discrepancy flag byte may be sent by the workstation to indicate that some type of postage meter discrepancy preceded the current transaction. An unverified transaction flag may be sent which would indicate that the transaction was previously run and was not verified by the host system. This unverified transaction flag will typically be sent if for some reason the host system is unavailable for communication with the workstation and is, thus, not able to verify that the entered account number is a valid account number.

As can be appreciated, the host system upon receipt of the above described transaction data fields is operable to perform a number of valuable functions. For example, the aforedescribed Operator Performance Reports and Machine Performance Reports may be generated by the host based upon related fields, such as the Operator ID and Job Type data fields in the transaction data field. The host may further be operable for verifying the validity of an entered account number and/or operator ID. Also, information relating to the date and time of a mailing transaction can be accumulated by the host and associated with each mail transaction. All of this data may be thereafter utilized by the host to generate reports which succinctly and accurately summarize the mailing activity for each account maintained by the host. These reports can be utilized for the accurate billing of each account for mailing costs and disbursements and may also be utilized by the accounts themselves as a description of their mail-related costs. Thus, efficiencies in billing and mail utilization can be achieved.

To facilitate the generation and preparation of these reports, the host may also have stored other data fields associated with those transaction data fields which are transmitted by the workstation. For example, in conjunction with each account number maintained by the host there may be a data field which contains the corresponding account name. The account name may more readily identify a given account to a reader of the report than would the number itself. Similarly, the host may have a data field associated with the operator ID data field for similarly identifying a particular operator by name.

A still further advantage made possible by the use of the invention is the capability of customizing, or altering, the amount and type of data which is processed by the host or which is contained within the transaction data fields. As has been previously stated, a system operator may, at the host or at a workstation, specify which data fields of the optional data fields are to be sent as part of the transaction data field. After specifying those optional data fields which are desired to be sent, the host system is enabled to transmit data to the workstation, the data indicating which fields the workstation is to prompt the operator to enter. This data is transmitted to the workstation typically during the Workstation Initialization Procedure. Thus, efficiencies are realized in that certain data fields may be eliminated from the transaction record fields, thereby permitting the more rapid accomplishment of each given transaction inasmuch as the operator is required to enter less data into the workstation. This data customizing can be accomplished on a workstation-by-workstation basis, or even on an account-by-account basis, resulting in great flexibility being achieved in the entering of data and the subsequent generation of mailing related summary reports. Alternatively, all of the aforedescribed data fields may be sent from the workstation to the host for each transaction, the host thereafter storing and processing only those data fields which have been previously specified.

As can be appreciated, a number of variations of the apparatus and method of the invention disclosed herein may occur to those skilled in the art. For example, although the invention has been described in the context of a postage dispensing system, the invention may also be advantageously employed in a variety of value printing systems wherein the values printed may be associated with definable accounts. Such value printing systems may be systems that print tickets for entertainment events or systems that print lottery tickets. Also, the invention may be advantageously employed in other than value printing systems, such as in systems that account for office equipment usage. In such a system a workstation may coupled to, for example, a document copier so that the usage of the copier can be accurately accounted for. For example, in order to initiate a copying session to generate copies of a document an operator may enter an account code to which the cost of the copies is to be charged. If the account code is determined to be valid the workstation will enable the copier to make a desired number of copies. After the copies are made the workstation may transmit to the host the actual number of copies made, as determined from the copier, and other data, such as the start time, end time, special fees, etc. From this data the host may subsequently print a report which summarizes the total copy-related costs for the account over an interval of time. The report may also be indicative of other data, such as the total number of copies and/or any special charges related to copying, such as charges for collating the copies, hand delivery of the copies, etc. Thus, the invention is not to be considered to be limited by the embodiments disclosed herein the invention is instead intended to be limited only as defined by the appended claims.

What is claimed is:

1. A method for centrally managing a mailing system comprising the steps of:
    (a) providing a plurality of computer-controlled workstations each of which is operable to originate a mailing transaction, each of said workstations having means for entering data expressive of a mailing transaction, each of said workstations further being operable for storing data fields expressive of an entered mailing transaction, said data fields including at least the following fields:
        (i) account ID,
        (ii) date,
        (iii) workstation ID,
        (iv) dispensed postage amount,
        (v) charged postage amount,
    (b) coupling each of a plurality of said workstations to a postage dispensing device such that each workstation is enabled to activate the device to dispense postage and also to receive data from the device related to the dispensing of postage;
    (c) coupling each of the workstations to a host data processing system such that each workstation is enabled to bidirectionally communicate data with the host system, and storing at the host system the different account IDs which may be charged for mailing transactions made at the respective workstations;
    (d) said host system specifying predetermined ones of data fields as fixed data fields which are to be included within a mailing transaction, said fixed data fields including at least items (i), (iv) and (v) in step (a);
    (e) originating mailing transactions at each of said workstations and storing at each workstation, for each mailing transaction thereof, data expressive of the mailing transaction thereof including at least the data fields specified by the host system in step (d);
    (f) transmitting the mail transaction data from each workstation to the host system;
    (g) storing at the host system the transmitted mailing transactions data of step (f); and
    (h) based on the stored transactions data of step (g) from the various workstations, allocating the cost of mailing transactions originating at said workstations among the different account I.D.'s stored at the host system.

2. The method as defined in claim 1 wherein said fixed data fields further comprise:
    a mailpiece total data field.

3. The method as defined in claim 2 wherein said fixed data fields further comprise:
    an operator ID field;
    the workstation ID.

4. The method as defined in claim 3 wherein said data fields further comprise:
    said date data field;
    a time of transaction start data field;
    a time of transaction end data field.

5. The method as defined in claim 4 wherein said data fields further comprise:
    a job identification data field;
    a job type data field;
    special fee data fields.

6. The method as defined in claim 4 wherein each said workstation further comprises calendar/clock means operable for generating said date data field, said time of transaction start data field and said time of transaction end data field.

7. The method as defined in claim 3 further including the step of generating an operator performance report and a machine performance report from the operator ID data field and the workstation ID data field, respectively.

8. The method as defined in claim 2 wherein said mailpiece total data field and said dispensed postage amount data field are obtained by said workstation from said postage dispensing device.

9. The method as defined in claim 1 further comprising the steps of:
    said host system verifying that the account ID data field relates to a valid account; and
    said host system transmitting a postage dispensing enabling signal to said workstation after verifying that the account ID data field is associated with a valid account.

10. The method as defined in claim 1 further including the step of:
    said host system generating a report from the transaction data stored within said host system, said report being indicative at least of an account ID and an amount of postage charged to said account ID.

11. The method as defined in claim 1 wherein said predetermined ones of said data fields are determined by an operator of said host system.

12. A centralized accounts management system comprising:
(a) plural operator workstations for performing mail processing functions chargeable to different accounts, each workstation having data processing and data entry means operatively coupled to data memory means for storing mail transaction data therein, said transaction data comprising a plurality of data fields including at least data fields relating to identification of each account and chargeable postage and non-postage mailing costs, said workstations each having a postage dispensing device operatively coupled thereto for dispensing postage upon command of said workstation thereof, said workstations also each having report generating means for generating reports based on at least some of said data fields;
(b) a host system, said host system having data processing means communicatively coupled to each of said workstations for receiving stored mail transaction data from each of said workstations, said host system also including memory means for storing said mail transaction data and for storing identification data for each account which may be charged, said host system also having report generating means for generating reports based on at least the account identification and chargeable mailing costs data fields;
(c) said host system or each of said workstations having means for specifying predetermined ones of said data fields as fixed data fields which are to be included in transaction data received by said host system from respective workstations, said predetermined ones of said data fields including at least the fields relating to account identification and chargeable mailing costs; and
(d) means at said host system for allocating among its stored accounts the costs chargeable to each account in accordance with the transaction data received from said workstations.

13. The management system of claim 12 wherein the fixed data fields further comprise:
an account identification data field;
an actual postage charged data field.

14. The management system of claim 13 wherein the fixed data fields further comprise a mailpiece total data field.

15. The management system of claim 14 wherein the data fields further comprise:
an operator identification data field;
a workstation identification data field.

16. The management system of claim 15, wherein the data fields further comprises:
a date data field;
a time of transaction start data field;
a time of transaction end data field.

17. The management system of claim 12 wherein the data fields further comprise:
a job identification data field;
a job type data field;
special fee data fields;
a charged postage data field.

18. The management system of claim 13 further comprising:
means at the host system for verifying that the account identification data field is valid;
means at the host system for transmitting a postage dispensing enabling signal from the host system to the workstation if the account identification data field is so verified; and
means for activating the postage dispensing device to dispense a monetary value for postage.

19. The management system of claim 18 wherein the means for generating a report further comprises, for a specified account identification code:
means for determining an interval of time over which one or more mailing transactions occurred; and
means for summing the actual postage charged data fields for each of the mailing transactions having a date data field which indicates a date within the determined interval of time whereby the actual postage charged to the specified amount identification code during the interval of time is determined.

20. A method of accounting for mail-related costs comprising the steps of:
providing a plurality of workstations each of which is operable for originating mail transactions and for storing data fields expressive of respective mailing transactions conducted on behalf of a plurality of accounts, said data fields including those for postage and non-postage expenditures;
coupling each of the workstations to a different postage dispensing device such that each workstation is enabled to activate the device to dispense postage and also to receive data from the device related to the dispensing of postage;
coupling each of the workstations to a host data processing system such that each workstations is enabled to bidirectionally communicate data with the host system;
specifying, at a workstation, an account identification code related to each mailing transaction originating at said workstation and specifying, at said workstation, a mail class type with which each mailing transaction is associated;
transmitting, from each workstation to the host system, data indicative of an amount of postage expended for each transaction and the account to be charged therefor;
transmitting from the workstation to the host system data indicative of the amount of any non-postage expenditure chargeable to an account;
said host allocating to each account all postage and non-postage expenditures chargeable to each account in accordance with the data transmitted to it by the workstations.

21. The method of claim 20 wherein, if the mail class type is associated with a non-metered manual type of mailing transaction, it further comprises a step of:
transmitting from the workstation to the host system data indicative of a charge related to a manual activity performed for the account.

22. The method of claim 20, further comprising the step of the host system generating a report for each account listing the mailing transactions conducted on their behalf and the costs allocated to that account.

* * * * *